US012715283B2

(12) United States Patent
Karlsson et al.

(10) Patent No.: US 12,715,283 B2
(45) Date of Patent: Aug. 25, 2026

(54) VEHICLE DRIVING ASSEMBLY AND VEHICLE

(71) Applicant: Traton AB, Södertälje (SE)

(72) Inventors: Stefan Karlsson, Stallarholmen (SE); Jörgen Forsberg, Mariefred (SE); Per Arnelöf, Vendelsö (SE); Axel Lison Almkvist, Hägersten (SE)

(73) Assignee: Traton AB, Södertälje (SE)

( * ) Notice: Subject to any disclaimer, the term of this patent is extended or adjusted under 35 U.S.C. 154(b) by 294 days.

(21) Appl. No.: 18/569,318

(22) PCT Filed: Jun. 20, 2022

(86) PCT No.: PCT/SE2022/050603
§ 371 (c)(1),
(2) Date: Dec. 12, 2023

(87) PCT Pub. No.: WO2023/287334
PCT Pub. Date: Jan. 19, 2023

(65) Prior Publication Data

US 2024/0270067 A1 Aug. 15, 2024

(30) Foreign Application Priority Data

Jul. 12, 2021 (SE) .................................... 2150926-0

(51) Int. Cl.
*B60K 17/02* (2006.01)
*B60K 1/00* (2006.01)
*B60K 17/08* (2006.01)

(52) U.S. Cl.
CPC ................ *B60K 17/02* (2013.01); *B60K 1/00* (2013.01); *B60K 17/08* (2013.01); *B60K 2001/001* (2013.01)

(58) Field of Classification Search
CPC .......... B60K 17/02; B60K 1/00; B60K 17/08; B60K 2001/001; B60K 17/16; B60K 17/165; B60Y 2200/14
(Continued)

(56) References Cited

U.S. PATENT DOCUMENTS 10,518,627 B2 * 12/2019 Nagpal .................. B62D 21/11
11,065,949 B2 * 7/2021 Ziech .................. B60K 17/165
(Continued)

FOREIGN PATENT DOCUMENTS

CN 103029577 A 4/2013
CN 108583162 A 9/2018
(Continued)

OTHER PUBLICATIONS

Scania CV AB, International Patent Application No. PCT/SE2022/050603, International Search Report, Sep. 6, 2022.
(Continued)

*Primary Examiner* — James A Shriver, II
*Assistant Examiner* — Hilary L Johns
(74) *Attorney, Agent, or Firm* — Moore & Van Allen PLLC; W. Kevin Ransom

(57) ABSTRACT

A vehicle driving assembly is disclosed comprising an axle beam and a propulsion unit. The axle beam comprises a mounting section comprising a cavity with an opening facing in a direction perpendicular to an axial direction of the axle beam. The cavity accommodates a portion of the propulsion unit protruding into the cavity via the opening. The propulsion unit is attached to the mounting section of the axle beam with a number of fastening elements arranged at a first mounting interface and at a second mounting interface arranged at a respective side of an axial plane extending through a respective rotation axis of at least two opposing ground engaging wheels of the axle beam. The
(Continued)

present disclosure further relates to a vehicle comprising a vehicle driving assembly.

15 Claims, 4 Drawing Sheets

(58) Field of Classification Search
USPC .......................................................... 180/291
See application file for complete search history.

(56) References Cited

U.S. PATENT DOCUMENTS

| | | | | |
|---|---|---|---|---|
| 11,518,225 | B2 * | 12/2022 | Engerman | F16H 57/0426 |
| 11,548,383 | B2 * | 1/2023 | Engerman | B60K 17/16 |
| 11,602,968 | B2 * | 3/2023 | Ebert | B60B 35/008 |
| 11,840,115 | B2 * | 12/2023 | Ogawa | B21D 53/90 |
| 2019/0366834 | A1 * | 12/2019 | Nagpal | B60K 17/165 |
| 2020/0130412 | A1 * | 4/2020 | He | B60B 35/122 |
| 2020/0406682 | A1 * | 12/2020 | Ogawa | B21D 53/90 |
| 2021/0138885 | A1 * | 5/2021 | Engerman | B60K 17/16 |
| 2021/0252958 | A1 * | 8/2021 | Engerman | F16H 57/042 |
| 2021/0323393 | A1 * | 10/2021 | Kontermann | B60K 1/00 |
| 2022/0402322 | A1 * | 12/2022 | Ebert | B60B 35/008 |

FOREIGN PATENT DOCUMENTS

| | | | | |
|---|---|---|---|---|
| CN | 208290975 | U | 12/2018 | |
| CN | 212332371 | U | 1/2021 | |
| CN | 112356618 | A | 2/2021 | |
| DE | 665984 | C | 10/1938 | |
| DE | 29518401 | U1 | 4/1997 | |
| EP | 1652719 | A1 | 5/2006 | |
| EP | 3452323 | A1 | 3/2019 | |
| EP | 3805012 | A1 | 4/2021 | |
| WO | 2015139913 | A1 | 9/2015 | |
| WO | WO-2017106620 | A1 * | 6/2017 | B60K 17/165 |
| WO | 2017193130 | A1 | 11/2017 | |
| WO | 2020035227 | A1 | 2/2020 | |

OTHER PUBLICATIONS

Scania CV AB, International Patent Application No. PCT/SE2022/050603, Written Opinion, Sep. 6, 2022.
Scania CV AB, Swedish Patent Application No. 2150926-0, Office Action, Feb. 28, 2022.
Scania CV AB, Swedish Patent Application No. 2150926-0, Office Action, Mar. 14, 2023.
Scania CV AB, International Patent Application No. PCT/SE2022/050603, International Preliminary Report on Patentability, Jan. 16, 2024.

* cited by examiner

VEHICLE DRIVING ASSEMBLY AND VEHICLE

CROSS-REFERENCE TO RELATED APPLICATIONS

This application is a National Stage Patent Application (filed under 35 § U.S.C. 371) of PCT/SE2022/050603, filed Jun. 20, 2022, of the same title, which, in turn claims priority to Swedish Patent Application No. 2150926-0 filed Jul. 12, 2021, of the same title; the contents of each of which are hereby incorporated by reference.

TECHNICAL FIELD

The present disclosure relates to a vehicle driving assembly and a vehicle comprising a vehicle driving assembly.

BACKGROUND

The use of electric drive for vehicles provides many advantages, especially regarding local emissions. Such vehicles comprise one or more electric machines configured to provide motive power to the vehicle. These types of vehicles can be divided into the categories pure electric vehicles and hybrid electric vehicles. Pure electric vehicles, sometimes referred to as battery electric vehicles, only-electric vehicles, and all-electric vehicles, comprise a pure electric powertrain and comprise no internal combustion engine and therefore produce no emissions in the place where they are used.

A hybrid electric vehicle comprises two or more distinct types of power, such as an internal combustion engine and an electric propulsion system. The combination of an internal combustion engine and an electric propulsion system provides advantages with regard to energy efficiency, partly because of the poor energy efficiency of an internal combustion engine at lower power output levels. Moreover, some hybrid electric vehicles are capable of operating in pure electric drive when wanted, such as when driving in certain areas.

An electric machine is a machine that converts electrical energy into mechanical energy and vice versa. Most electric machines comprise magnets and wire windings, wherein the electric machine operate through the interaction between the magnetic field of the magnets and electric current in the wire windings to generate power in the form of torque and rotation of a rotor of the electric machine. The rotor is usually surrounded by a stator. Some electric machines comprise magnets in the rotor and wire windings in the stator and some other electric machines comprise wire windings in the rotor and magnets in the stator.

An electric powertrain usually comprises a transmission configured to transmit power between the electric machine and one or more wheels of the vehicle. The electricity is usually stored in a rechargeable battery of the vehicle and some different types of batteries are used, such as lithium-ion batteries, lithium polymer batteries, and nickel-metal hydride batteries.

A problem associated with vehicles is that various systems, arrangements, and components occupy space. As an example, in vehicles comprising an electric propulsion system, the batteries needed add weight and occupy space. That is, large sized batteries are normally needed to obtain a sufficient available operational range of the vehicle, especially in heavier types of vehicles comprising a pure electric propulsion system. However, the possible size of the batteries is normally limited by other systems, components, and arrangements of the vehicle.

Other general problems when designing vehicle systems and arrangements is development costs, manufacturing costs, and assembling costs. One aspect having an impact on these problems is that vehicles are usually sold in different version having different power and performance requirements. This is especially true for heavier vehicles which can be sold in a range of different versions having different layout, equipment, weight, and power requirements. Therefore, in many cases, a range of different propulsion systems have to be developed.

SUMMARY

It is an object of the present invention to overcome, or at least alleviate, at least some of the above-mentioned problems and drawbacks.

According to an aspect of the invention, the object is achieved by a vehicle driving assembly comprising an axle beam configured to support at least two opposing ground engaging wheels of a vehicle comprising the vehicle driving assembly and a propulsion unit configured to provide motive power to the vehicle via the at least two opposing ground engaging wheels. The axle beam comprises a mounting section comprising a cavity with an opening facing in a direction perpendicular to an axial direction of the axle beam. The cavity accommodates a portion of the propulsion unit protruding into the cavity via the opening. The propulsion unit is attached to the mounting section of the axle beam with a number of fastening elements arranged at a first mounting interface and at a second mounting interface, and wherein the first and second mounting interfaces are arranged at a respective side of an axial plane extending through a respective rotation axis of the at least two opposing ground engaging wheels.

Thereby, a rigid and durable vehicle driving assembly can be provided having conditions for being manufactured and assembled in a cost-efficient manner. Moreover, the propulsion unit can be removed from the axle beam in a simple and cost-efficient manner for example during service and repair procedures of a vehicle comprising the vehicle driving assembly.

Furthermore, since the first and second mounting interfaces are arranged at a respective side of an axial plane extending through a respective rotation axis of the at least two opposing ground engaging wheels, the impact from axle load deformations on the vehicle driving assembly can be reduced. As a further result, conditions are provided for using the vehicle driving assembly for vehicles that already have suspension systems developed for axle beams.

Due to these features, a vehicle driving assembly is provided circumventing the need for a flange connection between the axle beam and the propulsion unit of the vehicle driving assembly. In this manner, a space-efficient vehicle driving assembly is provided having conditions for being compact in a normally space critical area of a vehicle. Moreover, conditions are provided for assembling the propulsion unit as one unit before being mounted to the axle beam. In other words, since the need for a flange connection between the axle beam and the propulsion unit is circumvented, the vehicle driving assembly can comprise a self-contained propulsion unit.

As a result thereof, conditions are provided for standardizing the mounting section of the axle beam for accommodating different types of propulsion units thereby fulfilling different power/performance requirements in a simple and cost-efficient manner. Moreover, different types of self-contained propulsion units can be developed in a simpler and more cost-effective manner because the need for designing the propulsion unit together with the axle beam is circumvented or is at least reduced. In addition, early and simple verification test runs of the propulsion unit of the vehicle driving assembly can be performed in production, thereby optimizing production flows.

Furthermore, since the mounting section comprises the cavity configured to accommodate a portion of the propulsion unit protruding into the cavity via the opening, a vehicle driving assembly is provided having conditions for a quick, simple, and cost-efficient assembly. In addition, the vehicle driving assembly provides conditions for a quick, simple, and cost-efficient disassembly of the propulsion unit from the axle beam for example during service and repair procedures of a vehicle comprising the vehicle driving assembly.

Thus, a vehicle driving assembly is provided having conditions for reducing development costs, manufacturing costs, and assembling costs of vehicles.

Furthermore, a space-efficient solution is provided for arranging a propulsion unit to a vehicle which provides conditions for increasing the space available for other arrangements and systems of the vehicle. Moreover, a vehicle driving assembly is provided allowing the axle beam to be arranged at different orientations around the axial direction of the axle beam in different vehicles to enable better chassis packaging and/or ground clearance fit. As an example, the axle beam can be arranged to hold the propulsion unit in slightly different orientations relative to a forward moving direction of a vehicle comprising the vehicle driving assembly to thereby fit and provide space for other systems and arrangements of the vehicle, such as a suspension system of the vehicle.

In addition, as is further explained herein, one or both of the axle beam and the propulsion unit can be adapted such that the propulsion unit can be held at different angles around the axial direction of the axle beam in different vehicles to enable better chassis packaging and/or ground clearance fit without having to perform a major redesign or reconstruction of one or both of the propulsion unit and the axle beam. As an example, the axle beam and/or the propulsion unit can be arranged such that the propulsion unit is held in slightly different orientations relative to a forward moving direction at different vehicles comprising the axle beam to thereby fit and provide space for other systems and arrangements of the vehicle, such as a suspension system of the vehicle.

Accordingly, a vehicle driving assembly is provided overcoming, or at least alleviating, at least some of the above-mentioned problems and drawbacks. As a result, the above-mentioned object is achieved.

Thus, the axle beam comprises a mounting section for a propulsion unit configured to provide motive power to the vehicle via the at least two opposing ground engaging wheels. The mounting section comprises a cavity with an opening facing in a direction perpendicular to an axial direction of the axle beam. The cavity is configured to accommodate a portion of the propulsion unit protruding into the cavity via the opening.

Due to these features, an axle beam is provided having conditions for being combined with a propulsion unit in a manner circumventing the need for a flange connection between the axle beam and the propulsion unit. In this manner, a space-efficient axle beam is provided having conditions for being compact in a normally space critical area of a vehicle. Moreover, the propulsion unit can be assembled as one unit before being mounted to the axle beam. In other words, since the need for a flange connection between the axle beam and the propulsion unit is circumvented, self-contained propulsion units can be mounted to the axle beam.

As a result thereof, conditions are provided for standardizing the mounting section of the axle beam for accommodating different types of propulsion units thereby fulfilling different power/performance requirements in a simple and cost-efficient manner. Moreover, different types of self-contained propulsion units can be developed in a simpler and more cost-effective manner because the need for designing the propulsion unit together with the axle beam is circumvented or is at least reduced. In addition, early and simple verification test runs of the propulsion unit can be performed in production, thereby optimizing production flows.

Furthermore, since the mounting section comprises the cavity configured to accommodate a portion of the propulsion unit protruding into the cavity via the opening, an axle beam is provided having conditions for a quick, simple, and cost-efficient assembly of the propulsion unit. In addition, the axle beam provides conditions for a quick, simple, and cost-efficient disassembly of the propulsion unit from the axle beam for example during service and repair procedures of a vehicle comprising the axle beam.

Thus, an axle beam is provided having conditions for reducing development costs, manufacturing costs, and assembling costs of vehicles.

Furthermore, a space-efficient solution is provided for arranging a propulsion unit to a vehicle which provides conditions for increasing the space available for other arrangements and systems of the vehicle. Moreover, an axle beam is provided having conditions for being arranged at different orientations around the axial direction thereof in different vehicles to enable better chassis packaging and/or ground clearance fit. As an example, the axle beam can be arranged to hold the propulsion unit in slightly different orientations relative to a forward moving direction of a vehicle comprising the axle beam to thereby fit and provide space for other systems and arrangements of the vehicle, such as a suspension system of the vehicle.

In addition, as is further explained herein, the axle beam can be adapted to hold a propulsion unit at different angles around the axial direction of the axle beam in different vehicles to enable better chassis packaging and/or ground clearance fit without having to perform a major redesign or reconstruction of one or both of the propulsion unit and the axle beam. As an example, the axle beam can be arranged to hold the propulsion unit in slightly different orientations relative to a forward moving direction in different vehicles comprising the axle beam to thereby fit and provide space for other systems and arrangements of the vehicle, such as a suspension system of the vehicle.

Optionally, a respective rotation axis of the at least two opposing ground engaging wheels extends through the cavity. Thereby, an axle beam is provided having conditions for holding the propulsion unit relative to the vehicle in a simple and space-efficient manner.

Optionally, the axle beam of the vehicle driving assembly is configured to support more than 80%, or more than 95%, of the weight of the propulsion unit. Thereby, the need for supporting the weight of the propulsion unit by another structure of the vehicle than the axle beam is reduced or is even circumvented. In this manner, the propulsion unit can follow the movement of the axle beam in a simple and efficient manner when the axle beam is combined with a suspension system. In addition, less structural rigidity of the propulsion unit is required which gives more freedom in the choice of material of structural parts of the propulsion unit, such as a housing of the propulsion unit. As an example, aluminium alloys or the like can be used for structural parts of the propulsion unit which can save weight of the vehicle.

In addition, since the need is reduced for supporting the weight of the propulsion unit by another structure of the vehicle than the axle beam, a further space-efficient axle beam can be provided.

Optionally, the axle beam of the vehicle driving assembly is configured to transmit a driving torque generated by the propulsion unit and is configured to support more than 80%, or more than 95%, of the reaction torque induced on the propulsion unit by the generation of the driving torque. Thereby, the need for supporting the reaction torque induced on the propulsion unit by another structure of the vehicle than the axle beam is reduced or is even circumvented. In this manner, less structural rigidity of the propulsion unit is required which gives more freedom in the choice of material of structural parts of the propulsion unit, such as a housing of the propulsion unit. As an example, aluminium alloys or the like can be used for structural parts of the propulsion unit which can save weight of the vehicle. In addition, since the need is reduced for supporting the reaction torque induced on the propulsion unit by another structure of the vehicle than the axle beam, a further space-efficient axle beam can be provided.

Optionally, the propulsion unit comprises an electric motor and a transmission, wherein the electric motor is configured to provide motive power to the vehicle via the transmission. Thereby, an environmentally friendly vehicle driving assembly is provided having conditions for reducing development costs, manufacturing costs, and assembling costs of vehicles. Moreover, a space-efficient vehicle driving assembly can be ensured.

Optionally, the transmission comprises two or more different selectable gear ratios. Thereby, a more energy efficient vehicle driving assembly can be provided having conditions for applying sufficient driving torque onto the at least two opposing ground engaging wheels at various driving conditions.

Optionally, at least a portion of the transmission is arranged inside the cavity of the mounting section of the axle beam. Thereby, a further space-efficient vehicle driving assembly is provided having conditions for reducing development costs, manufacturing costs, and assembling costs of vehicles.

Optionally, the propulsion unit comprises a differential, and wherein the differential is arranged inside the cavity of the mounting section of the axle beam. Thereby, a further space-efficient vehicle driving assembly is provided having conditions for reducing development costs, manufacturing costs, and assembling costs of vehicles.

Optionally, the propulsion unit comprises two housing parts together accommodating a number of components of the propulsion unit, and wherein the two housing parts are attached to each other along a separation plane being substantially perpendicular to the axial direction of the axle beam. Thereby, a further simpler and more durable vehicle driving assembly can be provided. This is because in prior art solutions having a flange connection between the propulsion unit and the axle beam of a vehicle driving assembly, the housing split of a housing of the propulsion unit will have to be parallel to the axial direction of the axle beam. In most cases, transmission shafts of a propulsion unit are parallel to the axial direction of the axle beam and transmission shafts must be placed in bearing caps, bearing carries, internal walls and the like which negatively influences build in tolerances for the gear contact pattern if the housing split of a housing of the propulsion unit is parallel to the transmission shafts of the propulsion unit.

Thus, due to these features, transmission shafts of the propulsion unit of the vehicle driving assembly according to the present disclosure are allowed to extend in directions parallel to the axial direction of the axle beam, which provides conditions for a structural simple propulsion unit. Moreover, because the housing parts are attached to each other along a separation plane being substantially perpendicular to the axial direction of the axle beam, lower tolerances can be used, and assembly and disassembly of the propulsion unit is facilitated. A further effect is that an assembly production of gearboxes and propulsion units can be retained for assembling/producing the propulsion unit.

The housing split referred to above may also be referred to as split planes for housing parts of the housing of the propulsion unit.

Optionally, the distance between center axes of two fastening elements of the first and/or second mounting interfaces, measured in a direction parallel to the axial direction of the axle beam is at least 7%, or is at least 9%, of the total length of the axle beam measured in the direction parallel to the axial direction of the axle beam. Thereby, an even more rigid and durable vehicle driving assembly can be provided because fastening elements are separated over a large area which also can reduce the impact from axle load deformations on the vehicle driving assembly.

Optionally, the distance between a center axis of at least one fastening element of the first mounting interface and a center axis of at least one fastening element of the second mounting interface, measured in a direction perpendicular to the axial direction of the axle beam, is at least 13%, or is at least 18%, of the total length of the axle beam measured in the direction parallel to the axial direction of the axle beam. Thereby, the fastening elements are separated over a large area and far away from bearing positions to shafts of the axle beam which reduces the impact from axle load deformations on the vehicle driving assembly.

Optionally, the propulsion unit comprises a lubrication system contained in the propulsion unit. Thereby, further improved conditions are provided for assembling the propulsion unit as one unit before being mounted to the axle beam. Moreover, the need for a flange connection between the axle beam and the propulsion unit is further reduced allowing the vehicle driving assembly to be a self-contained propulsion unit.

As a result thereof, further improved conditions are provided for standardizing the mounting section of the axle beam for accommodating different types of propulsion units thereby fulfilling different power/performance requirements in a simpler and more cost-efficient manner. Moreover, different types of self-contained propulsion units can be developed in a simpler and more cost-effective manner because the need for designing the propulsion unit together with the axle beam is further reduced. In addition, early verification test runs of the propulsion unit of the vehicle driving assembly can be performed in production in a simpler manner, thereby optimizing production flows.

Optionally, the lubrication system of the propulsion unit is separate from lubrication arrangements of the axle beam. Thereby, further improved conditions are provided for assembling the propulsion unit as one unit before being mounted to the axle beam. Moreover, the need for a flange connection between the axle beam and the propulsion unit is further reduced allowing the vehicle driving assembly to be a self-contained propulsion unit.

According to a further aspect of the invention, the object is achieved by a vehicle comprising a vehicle driving assembly according to some embodiments of the present disclosure.

Since the vehicle comprises a vehicle driving assembly according to some embodiments, a vehicle is provided circumventing the need for a flange connection between the axle beam and the propulsion unit of the vehicle driving assembly. In this manner, a vehicle is provided comprising a space-efficient vehicle driving assembly is having conditions for being compact in a normally space critical area of the vehicle. Moreover, conditions are provided for assembling the propulsion unit as one unit before being mounted to the axle beam. In other words, since the need for a flange connection between the axle beam and the propulsion unit is circumvented, the vehicle driving assembly of the vehicle can comprise a self-contained propulsion unit.

As a result thereof, conditions are provided for standardizing the mounting section of the axle beam for accommodating different types of propulsion units thereby fulfilling different power/performance requirements in a simple and cost-efficient manner. Moreover, different types of self-contained propulsion units can be developed in a simpler and more cost-effective manner because the need for designing the propulsion unit together with the axle beam is circumvented or is at least reduced. In addition, early and simple verification test runs of the propulsion unit of the vehicle driving assembly of the vehicle can be performed in production, thereby optimizing production flows of the vehicle.

Furthermore, since the mounting section comprises the cavity configured to accommodate a portion of the propulsion unit protruding into the cavity via the opening, a vehicle is provided having conditions for a quick, simple, and cost-efficient assembly of the vehicle driving assembly. In addition, a vehicle is provided in which the propulsion unit of the vehicle driving assembly can be removed from the vehicle in a quick, simple, and cost-efficient manner for example during service and repair procedures of a vehicle comprising the vehicle driving assembly.

Thus, a vehicle driving assembly is provided having conditions for reducing development costs, manufacturing costs, and assembling costs of vehicles.

Furthermore, a space-efficient solution is provided for arranging the propulsion unit to the vehicle which provides conditions for increasing the space available for other arrangements and systems of the vehicle. Moreover, a vehicle is provided allowing the axle beam to be arranged at different orientations around the axial direction thereof in different vehicles to enable better chassis packaging and/or ground clearance fit of the vehicle. As an example, the axle beam can be arranged to hold the propulsion unit in slightly different orientations relative to a forward moving direction of the vehicle to thereby fit and provide space for other systems and arrangements of the vehicle, such as a suspension system of the vehicle.

In addition, as is further explained herein, one or both of the axle beam and the propulsion unit can be adapted such that the propulsion unit can be held at different angles around the axial direction of the axle beam in different vehicles to enable better chassis packaging and/or ground clearance fit without having to perform a major redesign or reconstruction of one or both of the propulsion unit and the axle beam.

Accordingly, a vehicle is provided overcoming, or at least alleviating, at least some of the above-mentioned problems and drawbacks. As a result, the above-mentioned object is achieved.

Optionally, the angle between a longitudinal axis of the vehicle and the direction in which the opening of the cavity is facing is less than 30 degrees or is less than 15 degrees. Thereby, a vehicle is provided in which the propulsion unit of the vehicle is mounted in a space-efficient manner to enable better chassis packaging and/or ground clearance fit of the vehicle.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
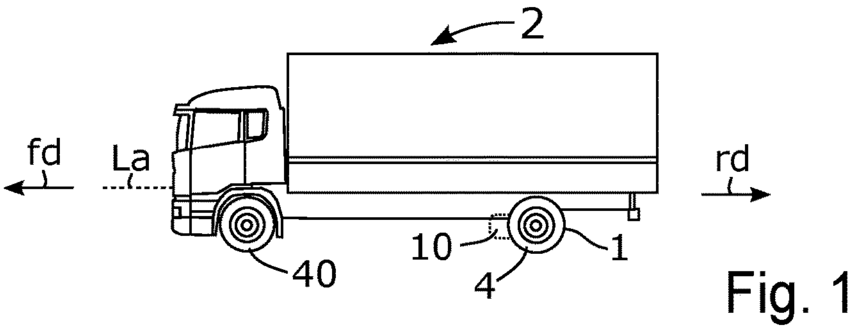
FIG. 1 illustrates a vehicle according to some embodiments.

FIG. 1 illustrates a vehicle 2 according to some embodiments. According to the illustrated embodiments, the vehicle 2 is a truck, i.e. a heavy vehicle. According to further embodiments, the vehicle 2, as referred to herein, may be another type of heavy or lighter manned or unmanned vehicle for land based propulsion such as a lorry, a bus, a construction vehicle, a tractor, a car, or the like.

The vehicle 2 comprises a vehicle driving assembly 10. As is further explained herein, the vehicle driving assembly 10 is configured to provide motive power to the vehicle 2 via wheels 4 of the vehicle 2. In FIG. 1, one wheel 4 of two opposing ground engaging wheels of the vehicle 2 can be seen. According to the illustrated embodiments, the vehicle driving assembly 10 is configured to provide motive power to the vehicle 2 via rear wheels 4 of the vehicle 2. The vehicle driving assembly 10 may also be referred to as a vehicle power train. According to the illustrated embodiments, the vehicle driving assembly 10 is a pure electric vehicle diving assembly comprising an electric motor for providing motive power to the vehicle 2, as is further explained herein. According to further embodiments, the vehicle driving assembly 10 may be, or form part of, an at least partially electric powertrain comprising an internal combustion engine for providing motive power to the vehicle 2.

The vehicle 2 may comprise a number of batteries, each comprising a number of battery cells, such as lithium-ion battery cells, lithium polymer battery cells, and/or nickel-metal hydride battery cells, for providing electricity to at least one electric machine of the vehicle driving assembly 10 during operation of the vehicle 2. Such battery/batteries are not illustrated in Fig. for reasons of brevity and clarity.

The vehicle 2 according to the illustrated embodiments comprises a pair of steered wheels 40. Moreover, in FIG. 1, a longitudinal axis La of the vehicle 2 is indicated. The longitudinal axis La of the vehicle 2 is parallel to a forward moving direction fd of the vehicle 2 as well as parallel to a reverse moving direction rd of the vehicle 2. That is, when the steered wheels 40 of the vehicle 2 are positioned in a centered straight position and the vehicle driving assembly 10 applies a driving torque onto wheels 4 of the vehicle 2 in a forward rotation direction, the vehicle 2 will move in the forward moving direction fd which is parallel to the longitudinal axis La of the vehicle 2. Likewise, when the steered wheels 40 of the vehicle 2 are positioned in a centered straight position and the vehicle driving assembly 10 applies a driving torque onto wheels 4 of the vehicle 2 in a reverse rotation direction, the vehicle 2 will move in the reverse moving direction rd which is parallel to the longitudinal axis La of the vehicle 2. The reverse moving direction rd is opposite to the forward moving direction fd.

Figure 2:
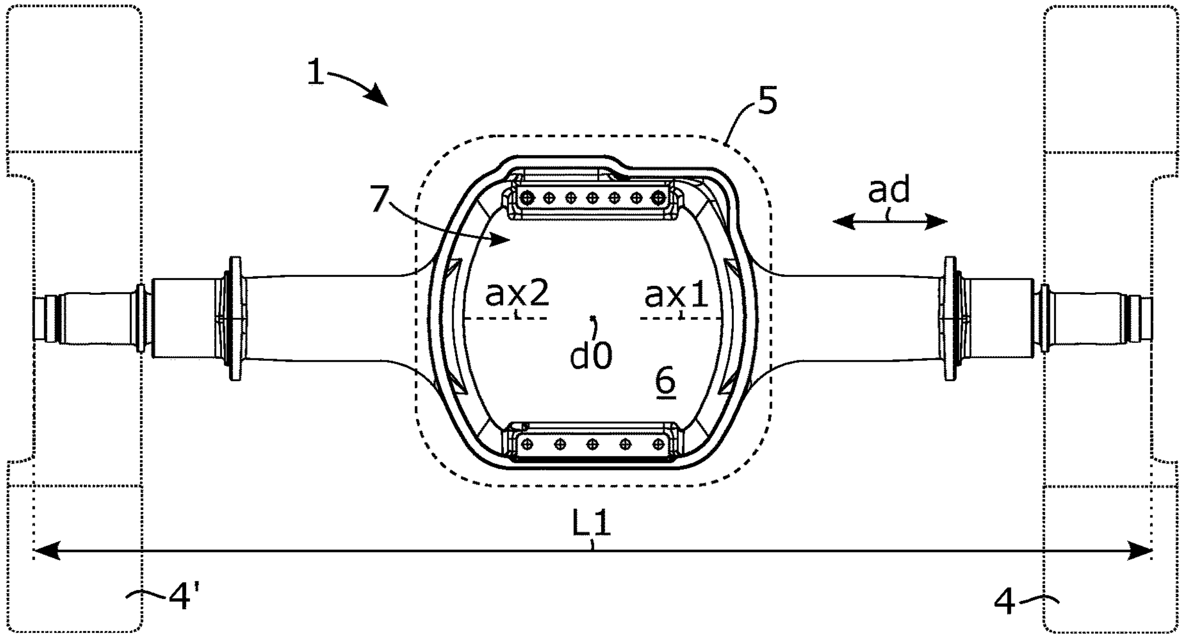
FIG. 2 schematically illustrates an axle beam of a vehicle driving assembly of the vehicle illustrated in FIG. 1.

FIG. 2 schematically illustrates an axle beam 1 of the vehicle driving assembly 10 of the vehicle 2 illustrated in FIG. 1. The axle beam 1 is also indicated in FIG. 1. Moreover, in FIG. 2, two opposing ground engaging wheels 4, 4' are schematically indicated. Below, simultaneous reference is made to FIG. 1 and FIG. 2, if not indicated otherwise.

The axle beam 1 is configured to support at least two opposing ground engaging wheels 4, 4' of a vehicle 2 comprising the axle beam 1. The feature that the at least two ground engaging wheels 4, 4' are opposing means that the at least two ground engaging wheels 4, 4' are arranged oppositely relative to each other at a respective side of the axle beam 1 and thus also arranged oppositely relative to each other at a respective side of the vehicle 2 comprising the axle beam 1. The feature that the at least two ground engaging wheels 4, 4' are ground engaging means that the at least two ground engaging wheels 4, 4' are configured to engage with, i.e. abut against, a ground surface, such as a road surface, during operation of the vehicle 2 comprising the at least two ground engaging wheels 4, 4'.

As understood from the herein described, the at least two ground engaging wheels 4, 4' are drive wheels of the vehicle 2. Therefore, the at least two ground engaging wheels 4, 4' may also be referred to as at least two drive wheels or at least two opposing ground engaging drive wheels. According to the illustrated embodiments, the at least two ground engaging wheels 4, 4' are rear wheels of the vehicle 2. Therefore, the at least two ground engaging wheels 4, 4' may also be referred to as at least two rear wheels or at least two opposing ground engaging rear wheels, According to the illustrated embodiments, the axle beam 1 is configured to support at least two opposing ground engaging wheels 4, 4' of a vehicle 2 comprising the axle beam 1 such that at a respective rotation axis ax1, ax2 of the at least two opposing ground engaging wheels 4, 4' is substantially parallel to an axial direction ad of the axle beam 1. The feature that a respective rotation axis ax1, ax2 of the at least two opposing ground engaging wheels 4, 4' is substantially parallel to an axial direction ad of the axle beam 1 may encompass that the angle between the respective rotation axis ax1, ax2 of the at least two opposing ground engaging wheels 4, 4' and the axial direction ad of the axle beam 1 is less than 7 degrees, or less than 5 degrees. As seen in FIG. 2, the axle beam 1 is elongated along the axial direction ad. According to the illustrated embodiments, the axial direction ad of the axle beam 1 is perpendicular to the longitudinal axis La of the vehicle 2. According to the illustrated embodiments, the axial direction ad of the axle beam 1 extends through the respective rotation axis ax1, ax2 of the at least two opposing ground engaging wheels 4, 4'.

Moreover, as can be seen in FIG. 2, the axle beam 1 comprises a mounting section 5 for mounting of a propulsion unit to the axle beam 1. As is further explained herein, the propulsion unit mounted to the mounting section 5 of the axle beam 1 is configured to provide motive power to the vehicle 2 via the at least two opposing ground engaging wheels 4, 4'.

As seen in FIG. 2, the mounting section 5 comprises a cavity 6. The cavity 6 has an opening 7 facing in a direction do. The direction do may also be referred to as a facing direction of the opening 7 of the cavity 6. As is further explained herein, the cavity 6 is configured to accommodate a portion of the propulsion unit mounted to the mounting section 5 of the axle beam 1, wherein the portion of the propulsion unit is protruding into the cavity 6 via the opening 7. According to the illustrated embodiments, the respective rotation axis ax1, ax2 of the at least two opposing ground engaging wheels 4, 4' extends through the cavity 6.

Figure 3:
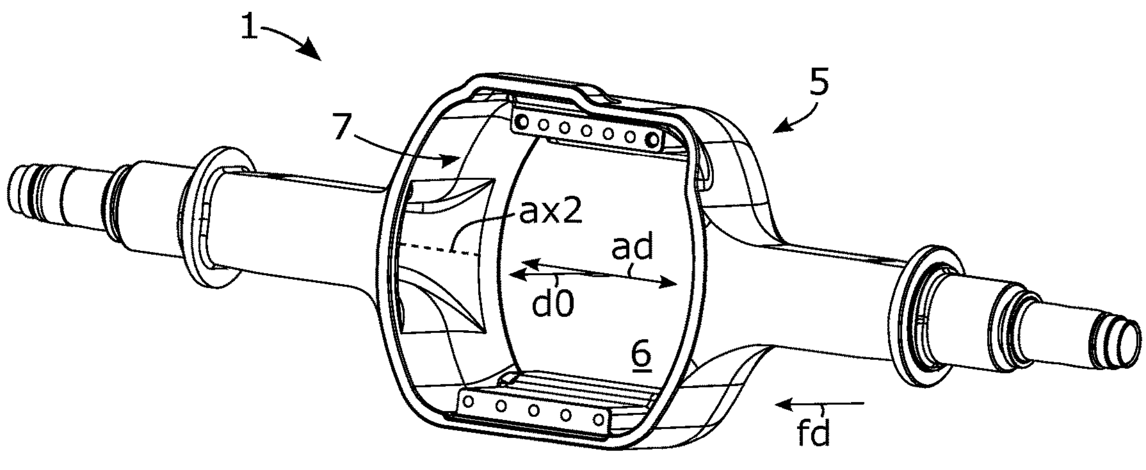
FIG. 3 illustrates a perspective view of the axle beam illustrated in FIG. 2.

FIG. 3 illustrates a perspective view of the axle beam 1 illustrated in FIG. 2. As is best seen in FIG. 3, the cavity 6 has an opening 7 facing in a direction do perpendicular to the axial direction ad of the axle beam 1. In this manner, several advantages are obtained, as is further explained herein.

Figure 4:
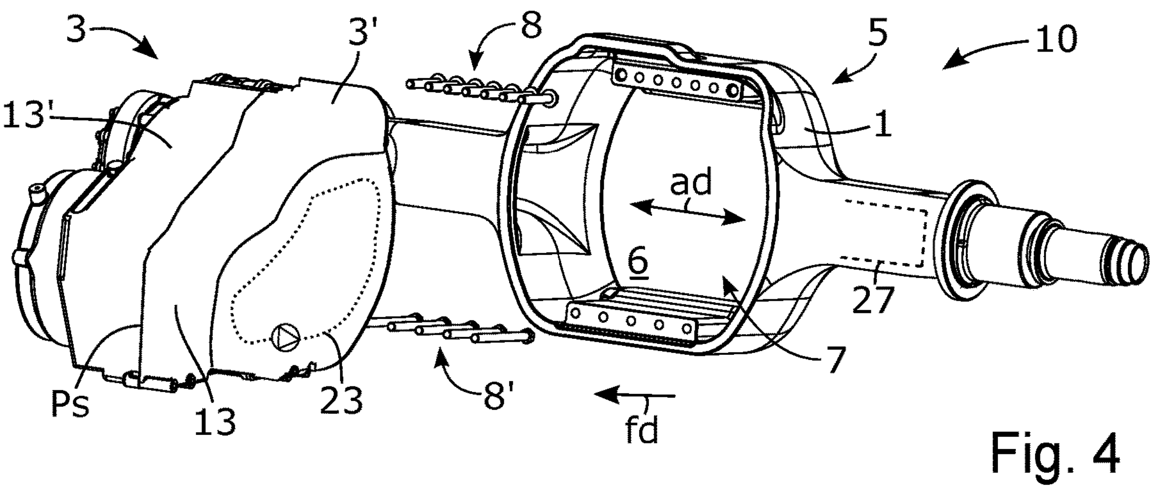
FIG. 4 illustrates a first perspective view of the vehicle driving assembly of the vehicle illustrated in FIG. 1 in a disassembled state.

FIG. 4 illustrates a first perspective view of the vehicle driving assembly 10 of the vehicle 2 illustrated in FIG. 1 in a disassembled state. The vehicle driving assembly 10 comprises an axle beam 1 according to the embodiments illustrated in FIG. 2 and FIG. 3. Moreover, the vehicle driving assembly 10 comprises a propulsion unit 3. According to the illustrated embodiments, the propulsion unit 3 is configured to be mounted to the mounting section 5 of the axle beam 1 using a number of fastening elements 8, 8', such as bolts.

Figure 5:
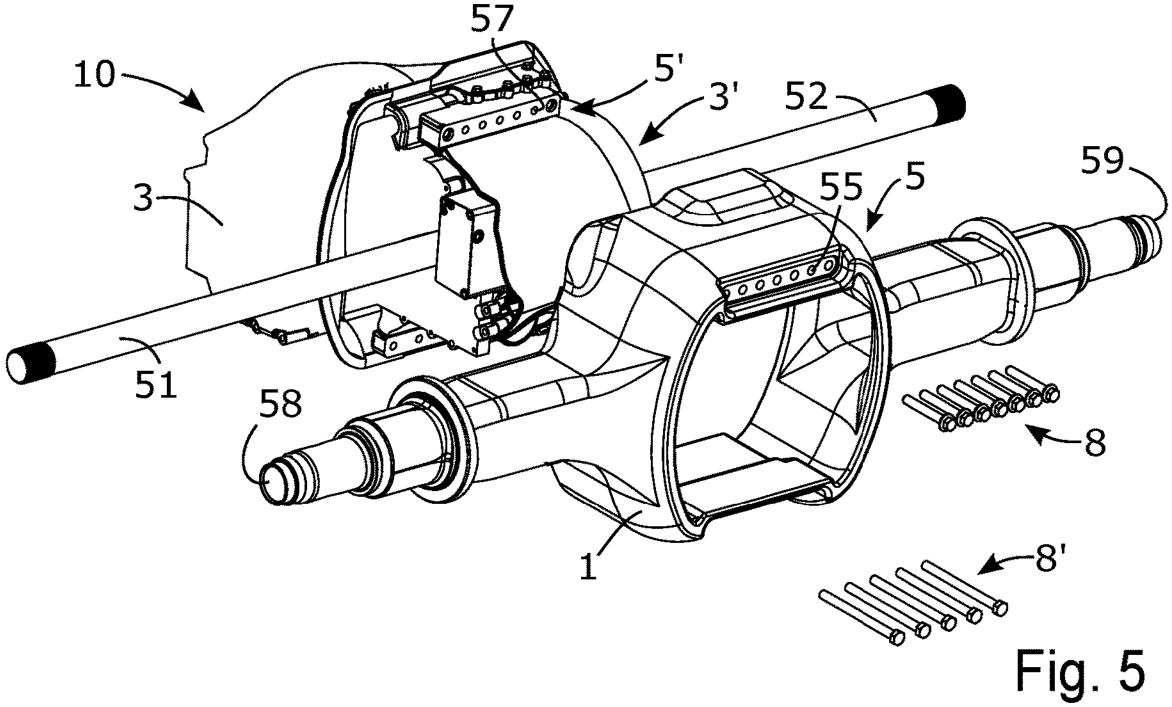
FIG. 5 illustrates a second perspective view of the vehicle driving assembly of the vehicle illustrated in FIG. 1 in a disassembled state.

FIG. 5 illustrates a second perspective view of the vehicle driving assembly 10 of the vehicle 2 illustrated in FIG. 1 in a disassembled state. Moreover, in FIG. 5, a pair of drive axles 51, 52 of the vehicle driving assembly 10 can be seen. The drive axles 51, 52 may be comprised in the axle beam 1. Furthermore, in FIG. 5, a mounting section 5' of the propulsion unit 3 can be seen. According to the illustrated embodiments, the mounting section 5 of the axle beam 1 comprises a number of through holes 55 and the mounting section 5' of the propulsion unit 3 comprises a number of threaded holes 57. For reasons of brevity and clarity, only one of the through holes 55 of the mounting section 5 of the axle beam 1 has been provided with the reference sign "55". Likewise, only one of the threaded holes 57 of the mounting section 5' of the propulsion unit 3 has been provided with the reference sign “57”. Each through hole 55 of the mounting section 5 of the propulsion unit 3 is configured to receive a fastening element 8, 8' extending through the through hole 55 into a threaded hole 57 of the mounting section 5' of the propulsion unit 3. In this manner, the vehicle driving assembly 10 can be assembled in a simple, quick, and reliable manner as is further explained herein.

However, according to further embodiments, the mounting section 5 of the axle beam 1 and the mounting section 5' of the propulsion unit 3 may have another design and/or layout than what is illustrated in FIG. 5. As an example, the mounting section 5' of the propulsion unit 3 may comprise a number of threaded pins each configured to protrude through a through hole 55 of the mounting section 5 of the axle beam 1, wherein the propulsion unit 3 is attached to the axle beam 1 by threading a nut onto the treaded portions of the pins.

Figure 6:
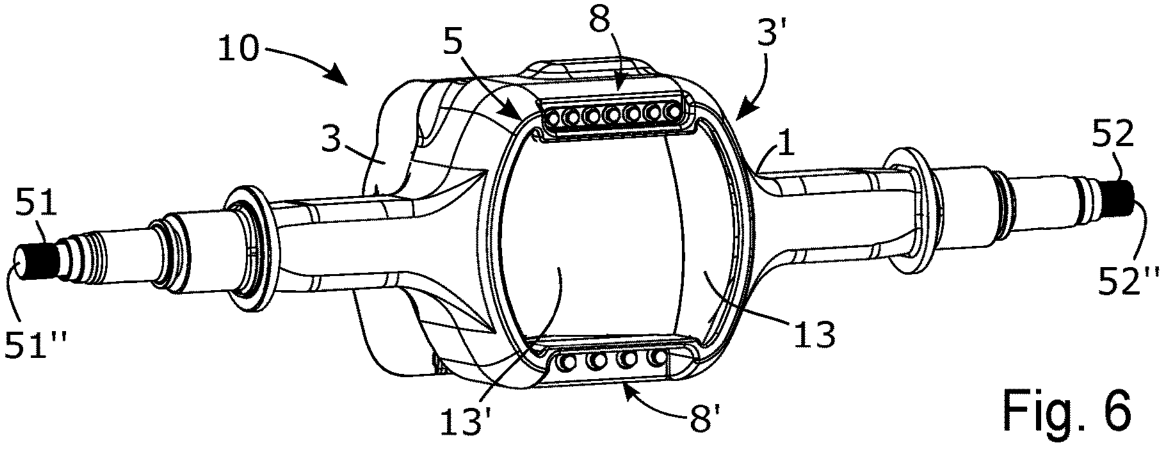
FIG. 6 illustrates the vehicle driving assembly according to the embodiments illustrated in FIG. 4 and FIG. 5 in an assembled state.

FIG. 6 illustrates the vehicle driving assembly 10 according to the embodiments illustrated in FIG. 4 and FIG. 5 in an assembled state. Below, simultaneous reference is made to FIG. 1-FIG. 6, if not indicated otherwise. According to the illustrated embodiments, when assembling the vehicle driving assembly 10, the propulsion unit 3 is inserted into the cavity 6 of the mounting section 5 via the opening 7 in an insertion direction opposite to the direction do in which the opening 7 of the cavity 6 is facing. When the propulsion unit 3 is inserted into the cavity 6 of the mounting section 5, a portion 3' of the propulsion unit 3 is protruding into the cavity 6 via the opening 7. In other words, as can be seen in FIG. 6, the cavity 6 accommodates a portion 3' of the propulsion unit 3 protruding into the cavity 6 via the opening 7 when the vehicle driving assembly 10 is in the assembled state.

The direction do in which the opening 7 of the cavity 6 is facing can also be referred to as a facing direction of the opening 7 of the cavity 6 of the mounting section 5.

The drive axles 51, 52 indicated in FIG. 5 and FIG. 6 may be inserted into openings 58, 59 of the axle beam 1, indicated in FIG. 5, after the propulsion unit 3 has been inserted into the cavity 6 of the mounting section 5 of the axle beam 1.

Due to the features of the vehicle driving assembly 10, the need for a flange connection between the axle beam 1 and the propulsion unit 3 is circumvented. That is, according to the illustrated embodiments, the vehicle driving assembly 10 lacks a sealing flange connection between the propulsion unit 3 and the axle beam 1. Instead, the propulsion unit 3 is formed as a self-contained propulsion unit which for example comprises its own lubrication system 23 as is schematically indicated in FIG. 4. In other words, the propulsion unit 3 can be formed as a stand-alone unit being less dependent on the design of the axle beam 1. That is, according to the illustrated embodiments, the propulsion unit 3 comprises a lubrication system 23 contained in the propulsion unit 3. As is further explained herein, the lubrication system 23 of the propulsion unit 3 is separate from lubrication arrangements 27 of the axle beam 1. A lubrication arrangement 27 of the axle beam 1 is schematically indicated in FIG. 4.

Since the need for a sealing flange connection between the propulsion unit 3 and the axle beam 1 is circumvented, a space-efficient vehicle driving assembly 1 is provided having conditions for being compact in a normally space critical area of a vehicle 2. Moreover, conditions are provided for assembling the propulsion unit 3 as one unit before being mounted to the axle beam 1. In other words, since the need for a flange connection between the axle beam 1 and the propulsion unit 3 is circumvented, the vehicle driving assembly 10 can comprise a self-contained propulsion unit.

As a result thereof, conditions are provided for standardizing the mounting section 5 of the axle beam 1 for accommodating different types of propulsion units 3 thereby fulfilling different power/performance requirements in a simple and cost-efficient manner. Moreover, different types of self-contained propulsion units 3 can be developed in a simpler and more cost-effective manner because the need for designing the propulsion unit 3 together with the axle beam 1 is circumvented or is at least reduced. In addition, early and simple verification test runs of the propulsion unit 3 of the vehicle driving assembly 10 can be performed in production, thereby optimizing production flows.

Furthermore, since the mounting section 5 comprises the cavity 6 configured to accommodate a portion 3' of the propulsion unit 5 protruding into the cavity 6 via the opening 7, a vehicle driving assembly 10 is provided having conditions for a quick, simple, and cost-efficient assembly. In addition, the vehicle driving assembly 10 provides conditions for a quick, simple, and cost-efficient disassembly of the propulsion unit 3 from the axle beam 1 for example during service and repair procedures of a vehicle 2 comprising the vehicle driving assembly 10. Thus, a vehicle driving assembly 10 is provided having conditions for reducing development costs, manufacturing costs, assembling costs, and maintenance costs of vehicles 2.

Furthermore, a space-efficient solution is provided for arranging a propulsion unit 3 to a vehicle 2 which provides conditions for increasing the space available for other arrangements and systems of the vehicle 2.

Moreover, a vehicle driving assembly 10 is provided allowing the axle beam 1 to be arranged at different orientations around the axial direction ad thereof in different vehicles to enable better chassis packaging and/or ground clearance fit. As an example, the axle beam can be arranged to hold the propulsion unit in slightly different orientations relative to a forward moving direction fd of a vehicle 2 comprising the vehicle driving assembly 10 to thereby fit and provide space for other systems and arrangements of the vehicle 2, such as a suspension system of the vehicle 2.

In addition, as is further explained herein, one or both of the axle beam 1 and the propulsion unit 3 can be adapted such that the propulsion unit 3 can be held at different angles around the axial direction ad of the axle beam 1 in different vehicles to enable better chassis packaging and/or ground clearance fit without having to perform a major redesign or reconstruction of one or both of the propulsion unit 3 and the axle beam 1. As an example, the axle beam 1 and/or the propulsion unit 3 can be arranged such that the propulsion unit 3 is held in slightly different orientations relative to a forward moving direction at different vehicles comprising the axle beam 1 to thereby fit and provide space for other systems and arrangements of the vehicle, such as a suspension system of the vehicle.

As understood from the above, according to the illustrated embodiments, the propulsion unit 3 may follow the movement of the axle beam 1 in vehicles comprising a suspension system because the propulsion unit 3 may be rigidly attached to the axle beam 1 when the vehicle driving assembly 10 is in an assembled state.

Moreover, as is indicated in FIG. 3 and FIG. 4, according to the illustrated embodiments, the axle beam 1 is attached to the vehicle such that the direction do in which the opening 7 of the cavity 6 is facing substantially coincides with the forward moving direction fd of the vehicle 2. In other words, according to the illustrated embodiments, the axle beam 1 is attached to the vehicle such that the direction do in which the opening 7 of the cavity 6 of is facing is substantially parallel to the longitudinal axis La of the vehicle 2 indicated in FIG. 1.

According to further embodiments, the axle beam 1 may be oriented in another manner relative to the vehicle 2. As an example, the axle beam 1 may be attached to the vehicle such that the direction do in which the opening 7 of the cavity 6 is facing is substantially coinciding with the reverse moving direction rd of the vehicle 2. Furthermore, according to some embodiments, the axle beam 1 may be attached to the vehicle 2 such that the angle between a longitudinal axis La of the vehicle 2 and the direction do in which the opening 7 of the cavity 6 is facing is less than 30 degrees or is less than 15 degrees.

According to the illustrated embodiments, the axle beam 1 is configured to support substantially the entire weight of the propulsion unit 3. That is, according to the illustrated embodiments, the propulsion unit 3 of the vehicle driving assembly 10 is not configured to be structurally supported relative to the vehicle 2 by another component of the vehicle 2 than the axle beam 1. As understood from the herein described, the axle beam 1 is configured to transmit a driving torque generated by the propulsion unit 3 to the at least two opposing ground engaging wheels 4, 4' of a vehicle 2 via the drive shafts 51, 52.

Moreover, when the driving unit 3 applies a driving torque onto the drive shafts 51, 52 in a first rotational direction, a reaction torque is induced on the propulsion unit 3 in a second rotational direction opposite to the first rotational direction. Since the propulsion unit 3 of the vehicle driving assembly 10 is not configured to be structurally supported relative to the vehicle 2 by another component than the axle beam 1, the axle beam 1 is also configured to support at least almost the full the reaction torque induced on the propulsion unit 3 by the generation of the driving torque.

However, according to further embodiments, the axle beam 1 may be configured to support more than 80%, or more than 95%, of the weight of the propulsion unit 3. Likewise, according to further embodiments, the axle beam 1 may be configured to support more than 80%, or more than 95%, of the reaction torque induced on the propulsion unit 3 by the generation of the driving torque.

The propulsion unit 3 of the vehicle driving assembly 10 may be connected to other systems/arrangements of the vehicle 2 via one or more of electric cables, signal cables, and fluid conduits. However, apart from arrangements for transmitting energy, signals, or fluids, between the propulsion unit 3 of the vehicle driving assembly 10 and other systems/arrangements of the vehicle 2, the propulsion unit 3 of the vehicle driving assembly 10 may lack any further connection to a chassis of a vehicle comprising the vehicle driving assembly 10.

Since the axle beam 1 is configured to support substantially the entire weight of the propulsion unit 3, the propulsion unit 3 does not need to support or carry axle loads of the axle beam 1 which provides more freedom in the choice of material of components of the propulsion unit 3, such as housing parts 13, 13' of the propulsion unit 3. Accordingly, such parts 13, 13' and components of the propulsion unit 3 can be made lighter in weight which provides conditions for a vehicle driving assembly 10 being lighter in weight. According to some embodiments, the housing parts 13, 13' of the propulsion unit 3 is made of an aluminium alloy.

Moreover, according to embodiments herein, the axle beam 1 is configured to support more than more than 80%, or more than 95%, of an axle load on the axle beam 1 without support of the propulsion unit 3 and any parts/components thereof, such as the housing parts 13, 13' of the propulsion unit 3. Also due to this feature, more freedom in the choice of the material of components of the propulsion unit 3 is provided, such as of housing parts 13, 13' of the propulsion unit 3.

Figure 7:
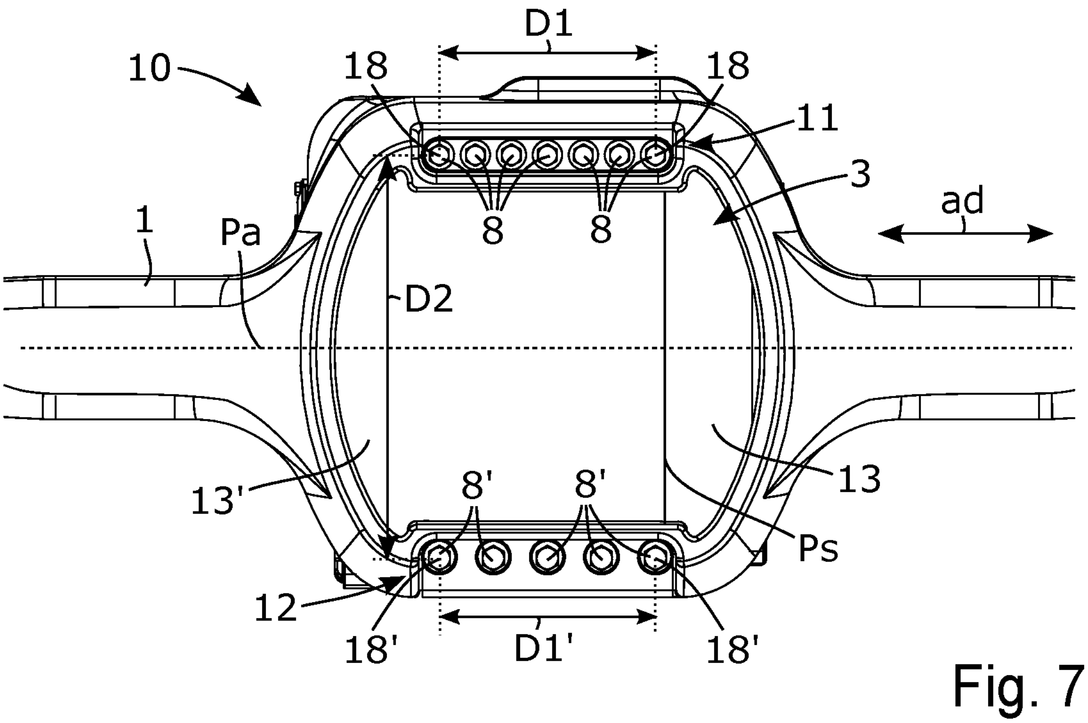
FIG. 7 illustrates an enlarged view of a portion of the vehicle driving assembly illustrated in FIG. 6, FIG. 8 schematically illustrates a number of components of a propulsion unit of the vehicle driving assembly according to the embodiments illustrated in FIG. 4-FIG. 7.

FIG. 7 illustrates an enlarged view of a portion of the vehicle driving assembly 10 illustrated in FIG. 6. In FIG. 7, the vehicle driving assembly 10 is illustrated in a viewing direction coinciding with the forward moving direction fd indicated in FIG. 3 and FIG. 4. Below, simultaneous reference is made to FIG. 1-FIG. 7, if not indicated otherwise.

In FIG. 7, an axial plane Pa of the vehicle driving assembly 10 is illustrated. The axial plane Pa extends through the respective rotation axis ax1, ax2 of the at least two opposing ground engaging wheels 4, 4' illustrated in FIG. 2. According to the illustrated embodiments, the axial plane Pa of the vehicle driving assembly 10 is substantially parallel to the direction do in which the opening 7 of the cavity 6 of is facing, i.e. the direction illustrated in FIG. 2 and FIG. 3. Moreover, according to the illustrated embodiments, the axial plane Pa of the vehicle driving assembly 10 extends through rotation axes of the drive shafts 51, 52 of the vehicle driving assembly 10 illustrated in FIG. 5 and FIG. 6.

As indicated in FIG. 7, the propulsion unit 3 is attached to the mounting section 5 of the axle beam 1 with a number of fastening elements 8 arranged at a first mounting interface 11 and a number of fastening elements 8' arranged at a second mounting interface 12, wherein the first and second mounting interfaces 11, 12 are arranged at a respective side of the axial plane Pa of the vehicle driving assembly 10. The first and second mounting interfaces 11, 12 may also be referred to a first and a second mounting portion of the vehicle driving assembly 10.

In more detail, according to the illustrated embodiments, the first mounting interface 11 comprises a first row of fastening elements 8. According to the illustrated embodiments, fastening elements 8 of the first row of fastening elements 8 forms a row being straight along a direction parallel to the axial plane Pa of the vehicle driving assembly 10 and thus also parallel to the axial direction ad of the axle beam 1. Moreover, according to the embodiments illustrated in FIG. 7, the first mounting interface 11 comprises seven fastening elements 8.

According to further embodiments, the first mounting interface 11 may comprise another number of fastening elements, such as a number between two and fifteen, or a number between four and twelve. Moreover, fastening elements 8 of the first mounting interface 11 may be arranged in another manner than along a straight row/line as is the case according to the embodiments illustrated in FIG. 7. As an example, fastening elements 8 of the first mounting interface 11 may be arranged along a curved path, such as an arc-shaped path having a radius of curvature substantially corresponding to the distance between an axial center portion of the first mounting interface 11 and the axial plane Pa of the vehicle driving assembly 10.

Moreover, according to the illustrated embodiments, the second mounting interface 12 comprises a second row of fastening elements 8'. According to the illustrated embodiments, fastening elements 8' of the second row of fastening elements 8' forms a row being straight along a direction parallel to the axial plane Pa of the vehicle driving assembly 10 and thus also parallel to the axial direction of the axle beam 1. Moreover, according to the embodiments illustrated in FIG. 7, the second mounting interface 12 comprises five fastening elements 8'.

According to further embodiments, the second mounting interface 12 may comprise another number of fastening elements, such as a number between two and fifteen, or a number between four and twelve. Moreover, fastening elements 8' of the second mounting interface 12 may be arranged in another manner than along a straight row/line as is the case according to the embodiments illustrated in FIG. 7. As an example, fastening elements 8' of the second mounting interface 12 may be arranged along a curved path, such as an arc-shaped path having a radius of curvature substantially corresponding to the distance between an axial center portion of the second mounting interface 12 and the axial plane Pa of the vehicle driving assembly 10.

According to the illustrated embodiments, the distance D1 between center axes 18 of two outermost fastening elements 8 of the first mounting interface 11, measured in a direction parallel to the axial direction ad of the axle beam 1, is approximately 11.8% of the total length L1 of the axle beam 1 measured in the direction parallel to the axial direction ad of the axle beam 1. The total length L1 of the axle beam 1 measured in the direction parallel to the axial direction ad of the axle beam 1 is indicated in FIG. 2. According to further embodiments, the distance D1 between center axes 18 of two outermost fastening elements 8 of the first mounting interface 11, measured in a direction parallel to the axial direction ad of the axle beam 1, may be at least 7%, or at least 9%, of the total length L1 of the axle beam 1 measured in the direction parallel to the axial direction ad of the axle beam 1.

Likewise, according to the illustrated embodiments, the distance D1' between center axes 18' of two outermost fastening elements 8' of the second mounting interface 12, measured in a direction parallel to the axial direction ad of the axle beam 1, is approximately 11.8% of the total length L1 of the axle beam 1 measured in the direction parallel to the axial direction ad of the axle beam 1. According to further embodiments, the distance D1' between center axes 18' of two outermost fastening elements 8' of the second mounting interface 12, measured in a direction parallel to the axial direction ad of the axle beam 1, may be at least 7%, or at least 9%, of the total length L1 of the axle beam 1 measured in the direction parallel to the axial direction ad of the axle beam 1.

According to the illustrated embodiments, the distance D2 between a center axis 18 of at least one fastening element 8 of the first mounting interface 11 and a center axis 18' of at least one fastening element 8' of the second mounting interface 12, measured in a direction perpendicular to the axial direction ad of the axle beam 1, is approximately 22.2% of the total length L1 of the axle beam 1 measured in the direction parallel to the axial direction ad of the axle beam 1. As mentioned above, the total length L1 of the axle beam 1 measured in the direction parallel to the axial direction ad of the axle beam 1 is indicated in FIG. 2. According to the illustrated embodiments, the total length L1 of the axle beam 1, measured in the direction parallel to the axial direction ad of the axle beam 1, is 2 040 millimeters. According to further embodiments, the total length L1 of the axle beam 1, measured in the direction parallel to the axial direction ad of the axle beam 1, may be within the range of 1 600-2 200 millimeters, or may be within the range of 1 800-2 100 millimeters.

According to some embodiments, the distance D2 between a center axis 18 of at least one fastening element 8 of the first mounting interface 11 and a center axis 18' of at least one fastening element 8' of the second mounting interface 12, measured in a direction perpendicular to the axial direction ad of the axle beam 1, may be at least 13%, or at least 18%, of the total length L1 of the axle beam 1 measured in the direction parallel to the axial direction ad of the axle beam 1.

Due to the fact that fastening elements 8, 8' of the vehicle driving assembly 10 are separated from each other in the above described manner, the impact from axle load deformations on the vehicle driving assembly 10 can be reduced. Moreover, conditions are provided for using the vehicle driving assembly 10 for vehicles that already have suspension systems developed for axle beams.

According to some embodiment, one or both of the first and second mounting interfaces 11, 12 may comprise vibration isolators, such as one or more elastic elements. In this manner, impact of road induced vibrations can be reduced.

As is indicated in FIG. 4, FIG. 6, and FIG. 7, the propulsion unit 3 comprises two housing parts 13, 13'. The two housing parts 13, 13' together accommodates a number of components of the propulsion unit 3, as is further explained herein. As is best seen in FIG. 4 and FIG. 7, the two housing parts 13, 13' are attached to each other along a separation plane Ps, wherein the separation plane Ps is substantially perpendicular to the axial direction ad of the axle beam 1 when the propulsion unit 3 is attached/mounted to the axle beam 1. In other words, the housing parts 13, 13' of the propulsion unit 3 are attached/can be separated along a separation plane Ps being substantially perpendicular to the axial direction ad of the axle beam 1. In this manner, several advantages are obtained as is explained in the following. The propulsion unit 3 may comprise at least two housing parts 13, 13'. That is, according to some embodiments, the propulsion unit 3 may comprise more than two housing parts 13, 13'. According to such embodiments, also such housing parts may be attached to each other along a separation plane, wherein the separation plane/planes is/are substantially perpendicular to the axial direction ad of the axle beam 1 when the propulsion unit 3 is attached/mounted to the axle beam 1.

The following is explained with simultaneous reference to FIG. 1-FIG. 7, if not indicated otherwise. The axle beam 1 is configured such that the propulsion unit 3 is inserted into the cavity 6 from a first side of a vertical plane extending through the respective rotation axis ax1, ax2 in a mounting procedure of the propulsion unit 3 to the axle beam 1, wherein the vertical plane is perpendicular to the axial plane Pa of the vehicle driving assembly 10. The axial plane Pa of the vehicle driving assembly 10 indicated in FIG. 7. According to the illustrated embodiments, each of the first and second mounting interfaces 11, 12 is arranged at a second side of the vertical plane referred to above, wherein the second side is opposite to the first side of the vertical plane. In this manner, a rigid and secure attachment of the propulsion unit 3 to the axle beam 1 can be provided and the impact from axle load deformations on the vehicle driving assembly 10 can be reduced. According to further embodiments, the first and/or second mounting interface 11, 12 may be differently arranged, such as in a region of the vertical plane or at the first side of the vertical plane.

As referred to above, one or both of the axle beam 1 and the propulsion unit 3 can be adapted such that the propulsion unit 3 can be held at different angles around the axial direction ad of the axle beam 1 relative to the axial plane Pa in different vehicles to enable better chassis packaging and/or ground clearance fit without having to perform a major redesign or reconstruction of one or both of the propulsion unit 3 and the axle beam 1. This may be obtained by the axle beam 1 comprising a cavity 6 of a sufficient size for accommodating propulsion units at different angles relative to the axial plane Pa of the axle beam 1 indicated in FIG. 7. Propulsion units may be arranged at different angles by adapting one or both of the first and second mounting interfaces 11, 12. As an alternative, or in addition, the location of one or both of the first and second mounting interfaces 11, 12 relative to the vertical plane referred to above may be adapted to mount propulsion units at different angles relative to the axial plane Pa of the axle beam 1. Such adaptation/adaptations require less work and less modifications than a major redesign or reconstruction of one or both of the propulsion unit 3 and the axle beam 1 which otherwise would be required.

Figure 8:
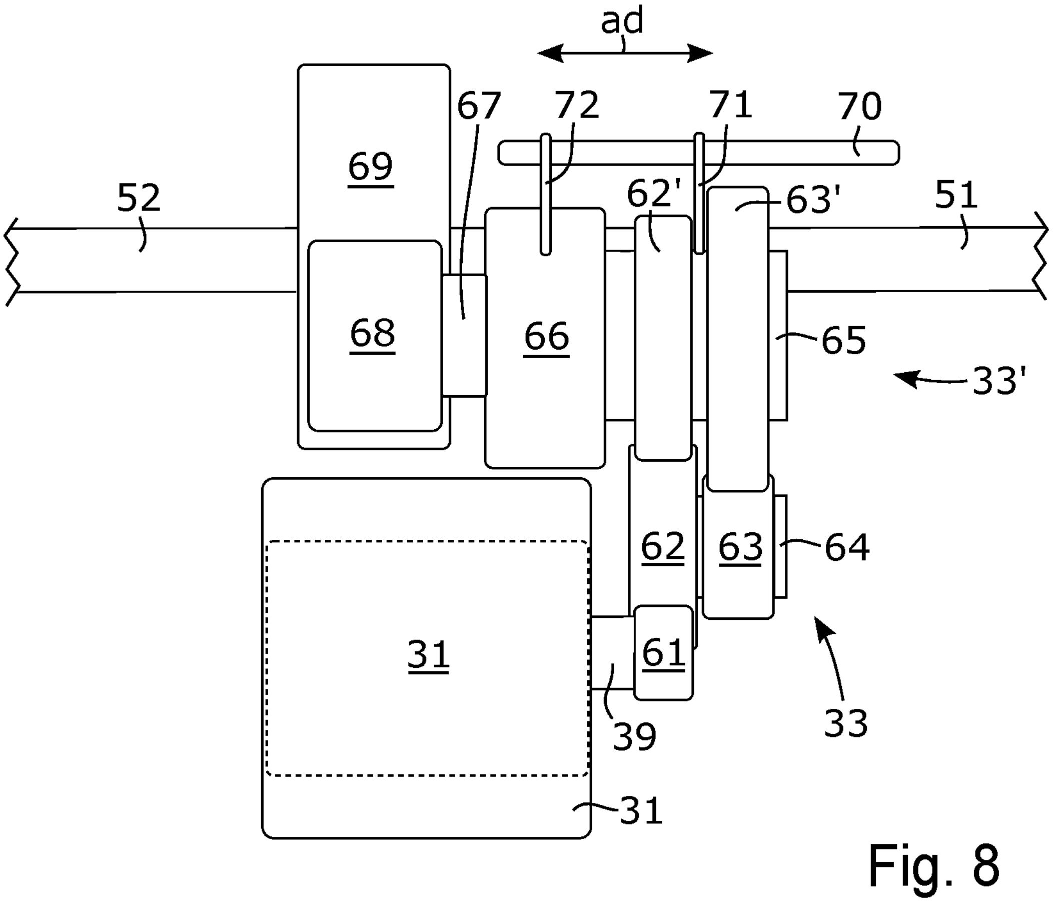

FIG. 8 schematically illustrates a number of components of the propulsion unit 3 of the vehicle driving assembly 10 according to the embodiments illustrated in FIG. 4-FIG. 7. Below, simultaneous reference is made to FIG. 1-FIG. 8 if not indicated otherwise. The number of components of the propulsion unit 3 illustrated in FIG. 8 comprise an electric motor 31, components of a transmission 33 of the propulsion unit 3, and the drive shafts 51, 52 which also can be seen in FIG. 5 and FIG. 6.

Thus, according to the illustrated embodiments, the propulsion unit 3 comprises an electric motor 31 and a transmission 33. The electric motor 31 is configured to provide motive power to the vehicle 2 via the transmission 33 and the drive shafts 51, 52 which are connected to the ground engaging wheels 4, 4'. The electric motor 31 may also be referred to as an electric propulsion motor, an electric propulsion machine, or the like.

As is further explained in the following, the transmission according to the illustrated embodiments comprises four different selectable gear ratios between a rotor 31' of the electric motor 31 and the drive shafts 51, 52. According to further embodiments, the transmission 33 may comprise two or more different selectable gear ratios or a fix gear ratio between the rotor 31' of the electric 31 and the drive shafts 51, 52.

In more detail, according to the illustrated embodiments, the transmission 33 comprises an input gear wheel 61 connected to an output shaft 39 of the electric motor 31. The output shaft 39 of the electric motor 31 is connected to the rotor 31' of the electric motor 31. The transmission 33 further comprises an output gear wheel 69. The output gear wheel 69 is connected to the drive shafts 51, 52 via a differential as is further explained herein.

The transmission 33 further comprises a first gear wheel pair 62, 62', a second gear wheel pair 63, 63', a lay shaft 64 and an intermediate shaft 65. The intermediate 65 shaft may also be referred to as a main shaft. A first gear wheel 62 of the first gear wheel pair 62, 62' is arranged on the lay shaft 64 and is rotationally locked thereto. The input gear wheel 61 is connected to the first gear wheel 62 of the first gear wheel pair 62, 62'.

The first gear wheel 62 of the first gear wheel pair 62, 62' is connected to a second gear wheel 62' of the first gear wheel pair 62, 62'. The second gear wheel 62' of the first gear wheel pair 62, 62' can be rotationally locked to the intermediate shaft 65 by a first coupling arrangement, such as a first dog clutch. Such a first coupling arrangement is not illustrated in FIG. 8 for reasons of brevity and clarity.

A first gear wheel 63 of the second gear wheel pair 63, 63' is arranged on the lay shaft 64 and is rotationally locked thereto. The first gear wheel 63 of the second gear wheel pair 63, 63' is connected to a second gear wheel 63' of the second gear wheel pair 63, 63'. The second gear wheel 63' of the second gear wheel pair 63, 63' can be rotationally locked to the intermediate shaft 65 by a second coupling arrangement, such as a second dog clutch. Such a second coupling arrangement is not illustrated in FIG. 8 for reasons of brevity and clarity.

As can be seen in FIG. 8, the first and second gear wheels 62, 62' of the first gear wheel pair 62, 62' have a different size ratio than the first and second gear wheels 63, 63' of the first gear wheel pair 63, 63'. Thus by either connecting the second gear wheel 62 of the first gear wheel pair 62, 62' to the intermediate shaft 65 or connecting the second gear wheel 63 of the second gear wheel pair 63, 63' to the intermediate shaft 65 two different gear ratios can be provided between the input gear wheel 61 and the intermediate shaft 65.

According to the illustrated embodiments, the transmission 33 comprises a planetary gearbox 66, also known as a planetary gearset or an epicyclic gear train. The intermediate shaft 65 is connected to an input shaft of the planetary gearbox 66. Moreover, the planetary gearbox 66 comprises an output shaft 67 connected to a drive gear wheel 68. The drive gear wheel 68 is connected to the output gear wheel 69 of the transmission 33. According to the illustrated embodiments, the planetary gearbox 66 comprises two different selectable gear ratios between the input shaft, i.e. the intermediate shaft 65, and the output shaft 67.

Thus, as understood from the above described, according to the illustrated embodiments, the transmission 33 comprises four different selectable gear ratios between the input gear wheel 61 and the output gear wheel 69. Moreover, in FIG. 8, a gear selector 70 is schematically indicated. The gear selector 70 comprises a fork 71 operably connected to the first and second coupling arrangements of the transmission 33 explained above. Moreover, the gear selector 70 comprises a gear selector unit 72 operably connected to the planetary gearbox 66 for selecting the gear ratio of the planetary gearbox 66. The gear selector 70 may comprise different actuators, actuator rods, and/or the like, for controlling the fork 71 gear selector unit 72 independently from each other.

According to further embodiments, the transmission 33 of the propulsion unit 3 may have a different layout of components, gears, and shafts, than according to the embodiments illustrated in FIG. 8. As an example, the transmission 33 may comprise one of a planetary gearbox 66 and gear ratios selectable via gear wheel pairs 62, 62', 63, 63'. Moreover, the transmission 33 may comprise more than one planetary gearbox 66. Furthermore, the transmission 33 may comprise more than two gear wheel pairs 62, 62', 63, 63'.

As can be seen in FIG. 8, the shafts of the transmission 33, such as the output shaft 39 of the electric motor 31, the lay shaft 64, the intermediate shaft 65 and the output shaft 67 of the planetary gearbox 66 are all parallel to the axial direction ad of the axle beam 1. In this manner, a space-efficient vehicle driving assembly 10 is provided and the need for bevel gears and the like is circumvented which provides conditions for a compact and energy efficient vehicle driving assembly 10.

Moreover, due to these features, and the fact that the two housing parts 13, 13' of the propulsion unit 3 are attached to each other along a separation plane Ps being substantially perpendicular to the axial direction ad of the axle beam 1, a further cost-efficient and more durable vehicle driving assembly can be provided. This is because the separation plane Ps of the two housing parts 13, 13' of the propulsion unit 3 is perpendicular to the shafts 39, 64, 65, 67 of the transmission 33. In this manner, the design of bearing caps, bearing carries, internal walls, and the like of the propulsion unit 3 is facilitated.

In addition, more advantageous build in tolerances for the gear contact pattern of gear wheels 61, 62, 62', 63, 63' 68, 69 are obtained. Furthermore, the propulsion unit 3 can be assembled and disassembled in a simpler manner. A further effect is that an assembly production of gearboxes and propulsion units can be retained for assembling/producing the propulsion unit 3 according to the embodiments explained herein.

This is because in prior art solutions having a flange connection between a propulsion unit and an axle beam of a vehicle driving assembly, the housing split of a housing of the propulsion unit will have to be parallel to the axial direction of the axle beam and thus also parallel to the shafts of the transmission of the propulsion unit which complicates the design of bearing caps, bearing carries, internal walls, and the like, and impair build in tolerances for the gear contact pattern of the propulsion unit.

As can be seen when comparing FIG. 6, FIG. 7, and FIG. 8, according to the illustrated embodiments, at least a portion 33' of the transmission 33 is arranged inside the cavity 6 of the mounting section 5 of the axle beam 1. In this manner, a further space-efficient and compact vehicle driving assembly 10 is provided.

Figure 9:
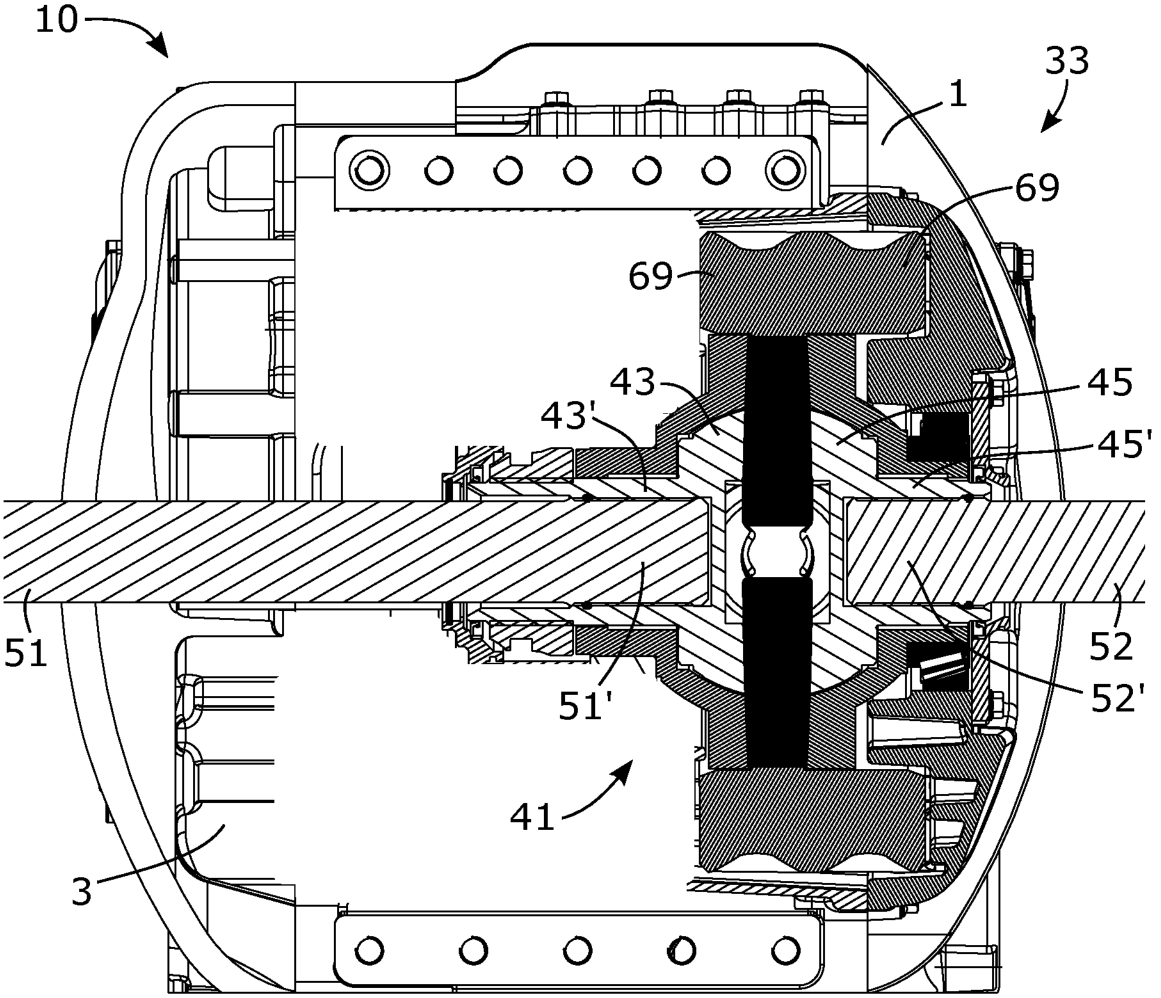
FIG. 9 illustrates a cross section of the vehicle driving assembly according to the embodiments illustrated in FIG. 4-FIG. 7.

FIG. 9 illustrates a cross section of the vehicle driving assembly 10 according to the embodiments illustrated in FIG. 4-FIG. 7. In FIG. 9, the vehicle driving assembly 10 is illustrated in an assembled state. Moreover, in FIG. 9, the two drive shafts 51, 52 can be seen.

In FIG. 9, the cross section is made in a plane comprising the respective rotation axis of the drive shafts 51, 52. Moreover, in FIG. 9, the cross section is made in a plane perpendicular to the axial plane Pa of the vehicle driving assembly 10 indicated in FIG. 7. According to the illustrated embodiments, the respective rotation axis of the drive shafts 51, 52 coincides with the respective rotation axis ax1, ax2 of the at least two opposing ground engaging wheels 4, 4' illustrated in FIG. 2.

Below, simultaneous reference is made to FIG. 1-FIG. 9, if not indicated otherwise. In FIG. 9, the output gear wheel 69 of the transmission 33 of the vehicle driving assembly 10 can be seen. Moreover, as seen in FIG. 9, according to the illustrated embodiments, the propulsion unit 3 comprises a differential 41. The differential 41 of the propulsion unit 3 is arranged inside the cavity 6 of the mounting section 5 of the axle beam 1, indicated in FIG. 2-FIG. 4, when the vehicle driving assembly 10 is in the assembled state.

As seen in FIG. 9, according to the illustrated embodiments, a first drive shaft 51 of the two drive shafts 51, 52 comprises a splined end portion 51' protruding into a splined collar 43' of a first part 43 of the differential 41. The first drive shaft 51 is rotationally locked to the first part 43 of the differential 41 via the splined connection between the splined end portion 51' of the first drive shaft 51 and the splined collar 43' of the first part 43 of the differential 41.

Likewise, a second drive shaft 52 of the two drive shafts 51, 52 comprises a splined end portion 52' protruding into a splined collar 45' of a second part 45 of the differential 41. The second drive shaft 52 is rotationally locked to the second part 45 of the differential 41 via the splined connection between the splined end portion 52' of the second drive shaft 52 and the splined collar 45' of the second part 45 of the differential 41.

The differential 41 is configured to allow different rotational speeds of the two drive shafts 51, 52 while the output gear wheel 69 of the propulsion unit 3 is transferring torque to one or both of the two drive shafts 51, 52 in a conventional manner. The differential 41 has the property that the rotational speed of one component of the output gear wheel 69, the first part 43, and the second part 45 is the average of the speeds of the others, or a fixed multiple of that average, in a conventional manner.

Due to the splined connection between the splined end portion 51' of the first drive shaft 51 and the splined collar 43' of the first part 43 of the differential 41 and the splined connection between the splined end portion 52' of the second drive shaft 52 and the splined collar 45' of the second part 45 of the differential 41, a vehicle driving assembly 10 is provided having conditions for being assembled and disassembled in a simple and cost-efficient manner.

According to the illustrated embodiments, the first drive shaft 51 is rotationally locked to a first ground engaging wheel 4, indicated in FIG. 2, and is configured to rotate around the same rotation axis ax1 as the first ground engaging wheel 4, indicated in FIG. 2. Likewise, the second drive shaft 52 is rotationally locked to a second ground engaging wheel 4', indicated in FIG. 2, and is configured to rotate around the same rotation axis ax2 as the second ground engaging wheel 4', indicated in FIG. 2. The first and second ground engaging wheels 4, 4' referred to above are arranged on either side of the axle beam 1, as can be seen in FIG. 2.

According to further embodiments, the rotation axes ax1, ax2 of the ground engaging wheels 4, 4' may not coincide with rotation axes of the drive shafts 51, 52. As an example, the axle beam 1 may comprise a final reduction gearing arrangement between ends 51", 52" of the drive shafts 51, 52, indicated in FIG. 6, and ground engaging wheels 4, 4', indicated in FIG. 2. Moreover, the ground engaging wheels 4, 4' may be arranged with a certain caster angle relative to the vehicle 2 causing the rotation axes ax1, ax2 thereof to differ from rotation axes of the drive shafts 51, 52.

The vehicle 2 illustrated in FIG. 1 is illustrated as comprising one vehicle driving assembly 10. However, according to further embodiments, the vehicle 2, as referred to herein may comprise two or more vehicle driving assemblies 10 according to the present disclosure for providing motive power to the vehicle 2.

As understood from the herein described, since the propulsion unit 3 according to the illustrated embodiments comprises an electric motor 31, there is no need for the transmission 33 to comprise reverse gearing. Instead, the propulsion unit 3 is capable of providing motive power in the reverse moving direction rd, indicated in FIG. 1, by reversing the rotational direction of the rotor 31' of the electric motor 31 illustrated in FIG. 8.

The wording "substantially parallel to", as used herein, may encompass that the angle between the objects referred to is less than 10 degrees, or is less than 7 degrees.

The wording "substantially coinciding with", as used herein, may encompass that the angle between the objects referred to is less than 10 degrees, or is less than 7 degrees.

The wording "substantially perpendicular to", as used herein, may encompass that the angle between the objects referred to is within the range of 80-100 degrees or is within the range of 83-97 degrees.

The wording "substantially corresponding to", as used herein, may encompass that the aspects, objects, distances, or measurements referred to deviates less than 10% from each other.

The direction do in which the opening 7 of the cavity 6 of is facing, i.e. the facing direction of the cavity 6 of the mounting section 5, may be defined as the direction of a normal of a plane extending through delimiting surfaces of the opening 7 of the cavity 6.

According to the embodiments illustrated herein, the axle beam 1 is configured to support at least two opposing ground engaging rear wheels of a vehicle 2 comprising the axle beam 1. Therefore, axle beam 1, as referred to herein, may also be referred to as a rear axle beam 1, or a rear wheel axle beam 1.

The mounting section 5, as referred to herein, is a section of the axle beam 1 to which the propulsion unit 3 can be mounted. According to the illustrated embodiments, the mounting section 5 has walls enclosing the entire cavity 6 of the mounting section 5. The mounting section 5 of the axle beam 1 may be a section of the axle beam 1 fully located inside an outer periphery of the axle beam 1.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A vehicle driving assembly comprising:

an axle beam configured to support at least two opposing ground engaging wheels of a vehicle comprising the vehicle driving assembly; and a propulsion unit configured to provide motive power to the vehicle via the at least two opposing ground engaging wheels, wherein the axle beam comprises a mounting section comprising a cavity with an opening facing in a direction perpendicular to an axial direction of the axle beam, wherein the cavity accommodates a portion of the propulsion unit protruding into the cavity via the opening, wherein the propulsion unit is attached to the mounting section of the axle beam with a number of fastening elements arranged at a first mounting interface and at a second mounting interface, and wherein the first and second mounting interfaces are arranged at a respective side of an axial plane extending through a respective rotation axis of the at least two opposing ground engaging wheels.

2. The vehicle driving assembly according to claim 1, wherein the propulsion unit comprises an electric motor and a transmission, wherein the electric motor is configured to provide motive power to the vehicle via the transmission.

3. The vehicle driving assembly according to claim 2, wherein the transmission comprises two or more different selectable gear ratios.

4. The vehicle driving assembly according to claim 2, wherein at least a portion of the transmission is arranged inside the cavity of the mounting section of the axle beam.

5. The vehicle driving assembly according to claim 1, wherein the propulsion unit comprises a differential, and wherein the differential is arranged inside the cavity of the mounting section of the axle beam.

6. The vehicle driving assembly according to claim 1, wherein the propulsion unit comprises two housing parts together accommodating a number of components of the propulsion unit, and wherein the two housing parts are attached to each other along a separation plane being substantially perpendicular to the axial direction of the axle beam.

7. The vehicle driving assembly according to claim 1, wherein the distance between center axes of two fastening elements of the first and/or second mounting interfaces, measured in a direction parallel to the axial direction of the axle beam, is at least 7% of a total length of the axle beam measured in the direction parallel to the axial direction of the axle beam.

8. The vehicle driving assembly according to claim 1, wherein a distance between a center axis of at least one fastening element of the first mounting interface and a center axis of at least one fastening element of the second mounting interface, measured in a direction perpendicular to the axial direction of the axle beam, is at least 13% of a total length of the axle beam measured in a direction parallel to the axial direction of the axle beam.

9. The vehicle driving assembly according to claim 1, wherein the propulsion unit comprises a lubrication system contained in the propulsion unit.

10. The vehicle driving assembly according to claim 9, wherein the lubrication system of the propulsion unit is separate from lubrication arrangements of the axle beam.

11. A vehicle comprising a vehicle driving assembly, said vehicle drive assembly comprising:

an axle beam configured to support at least two opposing ground engaging wheels of a vehicle comprising the vehicle driving assembly; and a propulsion unit configured to provide motive power to the vehicle via the at least two opposing ground engaging wheels, wherein the axle beam comprises a mounting section comprising a cavity with an opening facing in a direction perpendicular to an axial direction of the axle beam, wherein the cavity accommodates a portion of the propulsion unit protruding into the cavity via the opening, wherein the propulsion unit is attached to the mounting section of the axle beam with a number of fastening elements arranged at a first mounting interface and at a second mounting interface, and wherein the first and second mounting interfaces are arranged at a respective side of an axial plane extending through a respective rotation axis of the at least two opposing ground engaging wheels.

12. The vehicle according to claim 11, wherein an angle between a longitudinal axis of the vehicle and a direction in which the opening of the cavity is facing is less than 30 degrees.

13. The vehicle driving assembly according to claim 1, wherein the distance between center axes of two fastening elements of the first and/or second mounting interfaces, measured in a direction parallel to the axial direction of the axle beam is at least 9% of a total length of the axle beam measured in the direction parallel to the axial direction of the axle beam.

14. The vehicle driving assembly according to claim 1, wherein a distance between a center axis of at least one fastening element of the first mounting interface and a center axis of at least one fastening element of the second mounting interface, measured in a direction perpendicular to the axial direction of the axle beam is at least 18% of a total length of the axle beam measured in a direction parallel to the axial direction of the axle beam.

15. The vehicle according to claim 11, wherein an angle between a longitudinal axis of the vehicle and a direction in which the opening of the cavity is facing is less than 15 degrees.

* * * * *